(12) United States Patent
McRae et al.

(10) Patent No.: US 9,172,629 B1
(45) Date of Patent: Oct. 27, 2015

(54) CLASSIFYING PACKETS

(75) Inventors: Andrew McRae, Berowra (AU); Mohan Sundaram, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 1834 days.

(21) Appl. No.: 11/323,317

(22) Filed: Dec. 29, 2005
(Under 37 CFR 1.47)

(51) Int. Cl.
*H04L 12/28* (2006.01)
*G06F 11/00* (2006.01)
*H04L 12/701* (2013.01)

(52) U.S. Cl.
CPC ..................................... *H04L 45/00* (2013.01)

(58) Field of Classification Search
USPC .............. 370/229, 230, 230.1, 231, 351, 389, 370/392; 709/232, 224; 726/23, 24
See application file for complete search history.

(56) References Cited

U.S. PATENT DOCUMENTS

| | | | | |
|---|---|---|---|---|
| 5,509,006 | A * | 4/1996 | Wilford et al. | 370/401 |
| 5,835,591 | A * | 11/1998 | Cochon et al. | 380/212 |
| 6,336,138 | B1 * | 1/2002 | Caswell et al. | 709/223 |
| 6,499,061 | B1 * | 12/2002 | Benayoun et al. | 709/245 |
| 6,591,299 | B2 * | 7/2003 | Riddle et al. | 709/224 |
| 6,661,780 | B2 * | 12/2003 | Li | 370/324 |
| 6,674,743 | B1 * | 1/2004 | Amara et al. | 370/351 |
| 6,850,513 | B1 * | 2/2005 | Pelissier | 370/351 |
| 6,970,462 | B1 * | 11/2005 | McRae | 370/392 |
| 6,970,930 | B1 * | 11/2005 | Donovan | 709/227 |
| 7,096,383 | B2 * | 8/2006 | Talaugon et al. | 714/21 |
| 7,106,756 | B1 * | 9/2006 | Donovan et al. | 370/468 |
| 7,154,888 | B1 * | 12/2006 | Li et al. | 370/389 |
| 7,222,150 | B1 * | 5/2007 | Phillips et al. | 709/202 |
| 7,295,562 | B1 * | 11/2007 | Acharya et al. | 370/412 |
| 7,415,023 | B2 * | 8/2008 | Li et al. | 370/392 |
| 2002/0035698 | A1 * | 3/2002 | Malan et al. | 713/201 |
| 2002/0133594 | A1 * | 9/2002 | Syvanne | 709/226 |
| 2002/0191605 | A1 * | 12/2002 | Lunteren et al. | 370/389 |
| 2002/0194317 | A1 * | 12/2002 | Kanada et al. | 709/223 |
| 2003/0014627 | A1 * | 1/2003 | Krishna et al. | 713/153 |
| 2003/0026257 | A1 * | 2/2003 | Xu et al. | 370/392 |
| 2004/0095934 | A1 * | 5/2004 | Cheng et al. | 370/390 |
| 2004/0125815 | A1 * | 7/2004 | Shimazu et al. | 370/411 |
| 2004/0165587 | A1 * | 8/2004 | Kiyoto et al. | 370/389 |
| 2005/0114541 | A1 * | 5/2005 | Ghetie et al. | 709/232 |

(Continued)

OTHER PUBLICATIONS

Valluru, Sudha. "Classifying packets in a single pass." Network World. http://www.networkworld.com/news/tech/2005/071805techupdate.html. Jul. 2005.

(Continued)

*Primary Examiner* — Marsha D Banks Harold
*Assistant Examiner* — Christopher Wyllie
(74) *Attorney, Agent, or Firm* — Wall & Tong, LLC

(57) ABSTRACT

Classifying packets is disclosed. In some embodiments, a packet can be classified once for a plurality of nodes. The classification of a packet can be used at a receiving node to determine the receiving node policy for the packet. In some embodiments, the classification of a packet is specified by a classification index associated with the packet. In some embodiments, the receiving node policy for the packet can be determined by performing a lookup in a data structure associated with the receiving node based at least in part on the classification index of the packet. In some embodiments, the classification of the packet is sufficient to specify not only the receiving node policy but also a plurality of policies of a plurality of nodes.

20 Claims, 13 Drawing Sheets

(56) References Cited

U.S. PATENT DOCUMENTS

| | | | | |
|---|---|---|---|---|
| 2005/0125687 | A1* | 6/2005 | Townsend et al. | 713/200 |
| 2005/0125694 | A1* | 6/2005 | Fakes et al. | 713/201 |
| 2005/0273850 | A1* | 12/2005 | Freund | 726/14 |
| 2006/0007911 | A1* | 1/2006 | Hankins et al. | 370/351 |
| 2006/0161966 | A1* | 7/2006 | Nagampalli et al. | 726/1 |
| 2007/0008971 | A1* | 1/2007 | Li et al. | 370/392 |
| 2007/0041318 | A1* | 2/2007 | Guru et al. | 370/229 |
| 2007/0112794 | A1* | 5/2007 | McRae | 707/100 |
| 2007/0143847 | A1* | 6/2007 | Kraemer et al. | 726/23 |
| 2008/0069093 | A1* | 3/2008 | Maestas et al. | 370/389 |

OTHER PUBLICATIONS

Srinivasan et al. "Fast and Scalable Layer Four Switching." Proceedings 0f ACM SIGCOMM '98. pp. 191-202. Sep. 1998.

Lakshman et al. "High Speed Policy-based Packet Forwarding Using Efficient Multi-Dimensional Range Matching." Proceedings of SIGCOMM '98. pp. 203-214. 1998.

Gupta et al. "Packet Classification on Multiple Fields." Proceedings of SIGCOMM '99. 1999.

Gupta et al. "Algorithms for Packet Classification." IEEE Network, pp. 24-32, vol: 15:2. 2001.

Engler et al. "DPF: Fast, Flexible Message Demultiplexing using Dynamic Code Generation." Proceedings of SIGCOMM '96. pp. 53-59. 1996.

Bailey et al. "PathFinder: A Pattern-Based Packet Classifier." Appears in "Proceedings of the First Symposium on Operating Systems Design and Implementation." Usenix Association. Nov. 1994.

McRae, Andrew. "An Infrastructure for Deterministic Packet Classification." http://mcrae.homeunix.net/papers/packet_class/index.html.

McRae, Andrew. "High Speed Packet Classification." http://mcrae.homeunix.net/papers/packet_class/html/packet_classify_files/slide0003.htm.

Venkatachary, Srinivasan. "Fast and Efficient Internet Lookups," Dissertation, Jun. 29, 1999.

\* cited by examiner

| CLASSIFICATION INDEX | $R_1$ | $R_2$ | $R_3$ | $R_4$ | $R_5$ | $R_6$ | ... | $R_n$ |
|---|---|---|---|---|---|---|---|---|
| 1 | 0 | 1 | 0 | 1 | 1 | 0 | ← 0 → | 0 |
| 2 | | | | | | | | |
| 3 | | | | | | | | |
| 4 | | | | | | | | |
| 5 | | | | | | | | |
| 6 | | | | | | | | |
| 7 | | | | | | | | |
| ⋮ | | | | | | | | |
| N | | | | | | | | |

702 points to row 1; 704 points to the bottom of the index column.

CLASSIFYING PACKETS

BACKGROUND OF THE INVENTION

In typical gateway configurations, a packet is classified at each gateway node in order to determine the node policy to apply to the packet at each node. The same or a similar set of information is extracted from a packet to classify a packet at each node, and the packet may be classified with respect to some of the same rules or policies at multiple nodes. Thus, repeatedly classifying a packet at each gateway node results in redundant processing. It would be useful to eliminate such processing inefficiencies.

Thus, there is a need for a manner to classify a packet for multiple nodes in a single pass.

BRIEF DESCRIPTION OF THE DRAWINGS

Various embodiments of the invention are disclosed in the following detailed description and the accompanying drawings.

FIG. 7 illustrates an embodiment of a global classification table.

FIG. 9 illustrates an embodiment of a node table.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Classifying packets is disclosed. In some embodiments, a packet can be classified once for a plurality of nodes. The classification of a packet can be used at a receiving node to determine the receiving node policy for the packet. In some embodiments, the classification of a packet is specified by a classification index associated with the packet. In some embodiments, the receiving node policy for the packet can be determined by performing a lookup in a data structure associated with the receiving node based at least in part on the classification index of the packet. In some embodiments, the classification of the packet is sufficient to specify not only the receiving node policy but also a plurality of policies of a plurality of nodes.

Figure 1:
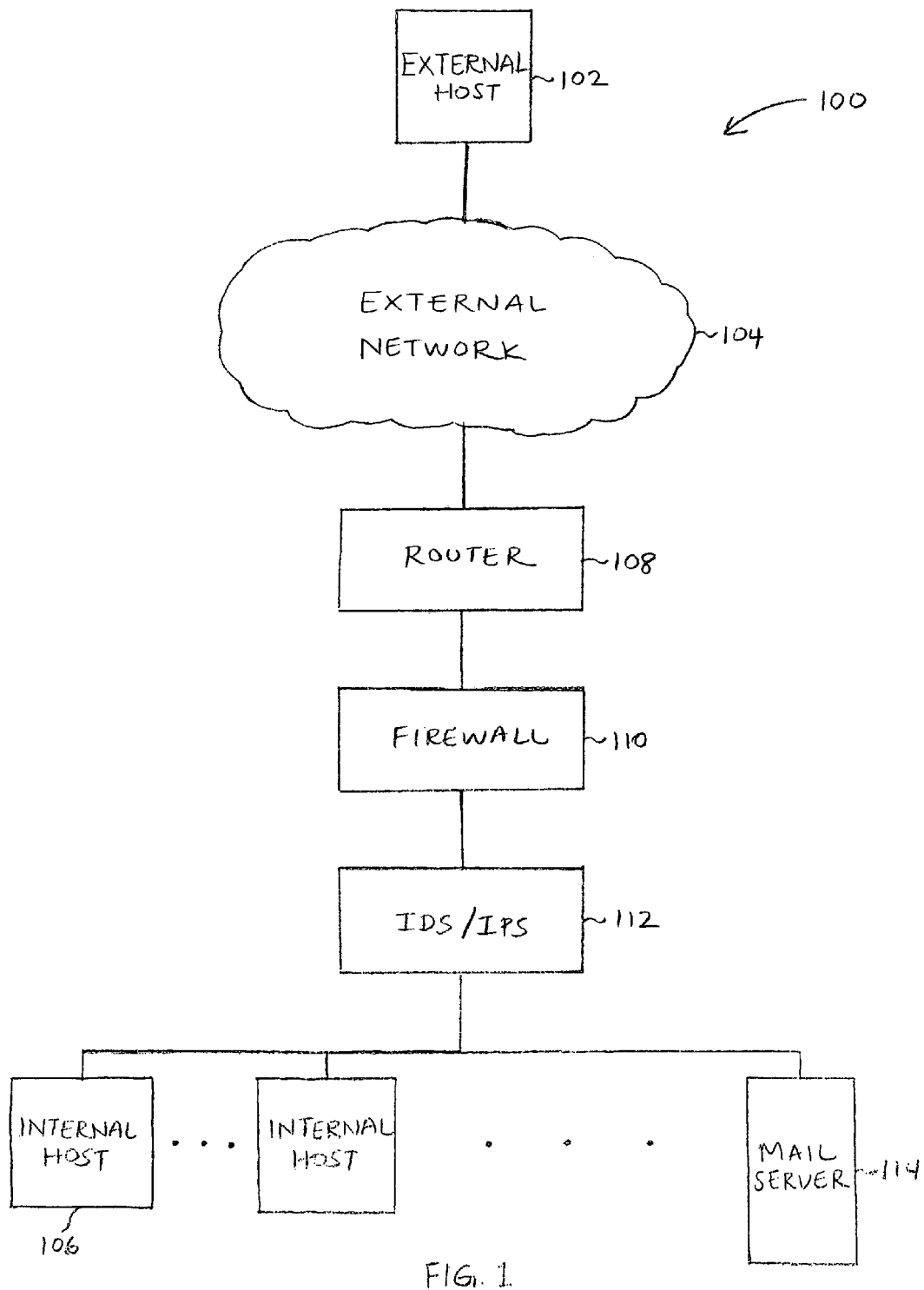
FIG. 1 illustrates an example of a typical network environment in which data packets are transmitted from an external network into a secured internal network.

FIG. 1 illustrates an example of a typical network environment in which data packets are transmitted from an external network into a secured internal network. In network environment 100, packets are transmitted from an external host 102 over an external network 104 to an internal host, such as internal host 106, in a secured internal network. The boundary of the secured internal network is defined by router 108. Router 108 performs routing operations on the packets received via external network 104 such as route lookup and packet forwarding and subsequently transmits the packets to firewall 110. Firewall 110 includes security services that check the validity of the received packets and includes nodes such as IPSEC decryption, filtering, Denial of Service (DoS) check, Network Address Translation (NAT), etc. As shown in the example of FIG. 1, the packets are further validated by an Intrusion Detection System (IDS)/Intrusion Prevention System (IPS) 112 before being forwarded to a destination, such as internal host 106 or mail server 114. At each internal network endpoint, such as internal host 106 or mail server 114, the packets may be further validated by an Anti-Virus (AV) node.

In the configuration depicted in FIG. 1, packets are first processed by router 108 and then subjected to validation by security devices such as firewall 110, IDS/IPS 112, AV nodes at internal network endpoints, etc. However, such a routing before security configuration is not optimal if a packet or a flow (e.g., a session) is found to be a threat or a potential threat by any security node through which it is processed and is not routed to its intended destination but instead is subjected to an appropriate security response. In such an event, the initial processing performed by router 108 is unnecessary. If a packet or flow is found to be a potential security threat at an AV node at an internal network endpoint, the processing by router 108 as well as the actual routing or forwarding of the packet or flow within the internal network to its destination is unnecessary and can be eliminated.

Figure 2:
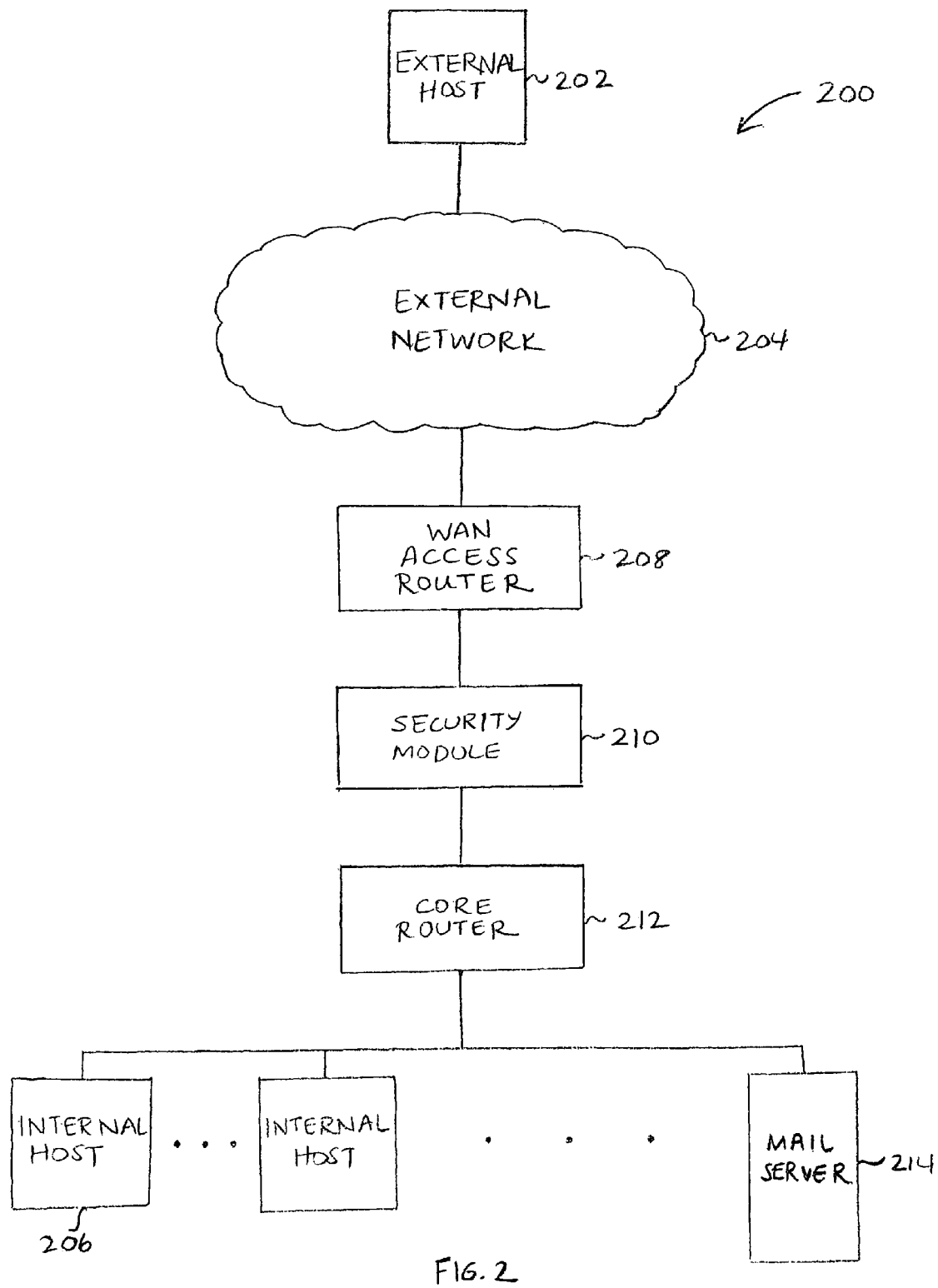
FIG. 2 illustrates another example of a typical network environment in which data packets are transmitted from an external network into a secured internal network.

FIG. 2 illustrates another example of a typical network environment in which data packets are transmitted from an external network into a secured internal network. In network environment 200, packets are transmitted from an external host 202 over an external network 204 to an internal host, such as internal host 206, in a secured internal network. The boundary of the secured internal network is defined by Wide Area Network (WAN) access router 208. WAN access router 208 performs initial routing operations on the packets received via external network 204. Access Control Lists (ACL) on WAN access router 208 may be enabled to provide a first level security check on the incoming data packets. From WAN access router 208, packets are transmitted to security module 210. Security services associated with a firewall, IDS/IPS, content filter, AV, etc., are integrated in security module 210. Once a packet or flow has been processed and validated by the various security nodes comprising security module 210, it is transmitted to core router 212 which performs routing operations, such as route lookup and packet forwarding, so that the packet or flow can be forwarded to its destination within the internal network, such as internal host 206 or mail server 214. Although in the given example security module 210 and core router 212 are illustrated separately, they may both be a part of a single, integrated device.

In the configuration of FIG. 2, all security services, including AV, are applied to a packet or flow when it is processed by security module 210 before any routing operations are performed on the packet or flow by core router 212. Although processing by core router 212 can be avoided if a packet or flow is found to be associated with a potential security threat by any security node of security module 210, the configuration of FIG. 2 is still not optimal because security module 210 lacks an interface to external network 204. The hardware architecture of such a device typically includes an ethernet interface and, therefore, requires an edge router, such as WAN access router 208, to interface with an external network. Irrespective of the hardware architecture, the software architecture of such a device is typically configured to perform routing before security. Therefore, in the configuration of FIG. 2, routing operations such as route lookup and packet forwarding are performed twice—at access router 208 and at core router 212.

As discussed with respect to FIG. 1 and FIG. 2, typical routing and security configurations do not optimally process data packets and/or flows entering a secured internal network. Such sub-optimal routing and security configurations result at least in part from legacy issues associated with the evolution of gateway devices. In order to optimally utilize resources, it is useful to first check the validity of data packets entering a secured network before routing valid packets so that routing operations are not unnecessarily and/or redundantly performed, such as in the configurations of FIG. 1 and FIG. 2.

Figure 3:
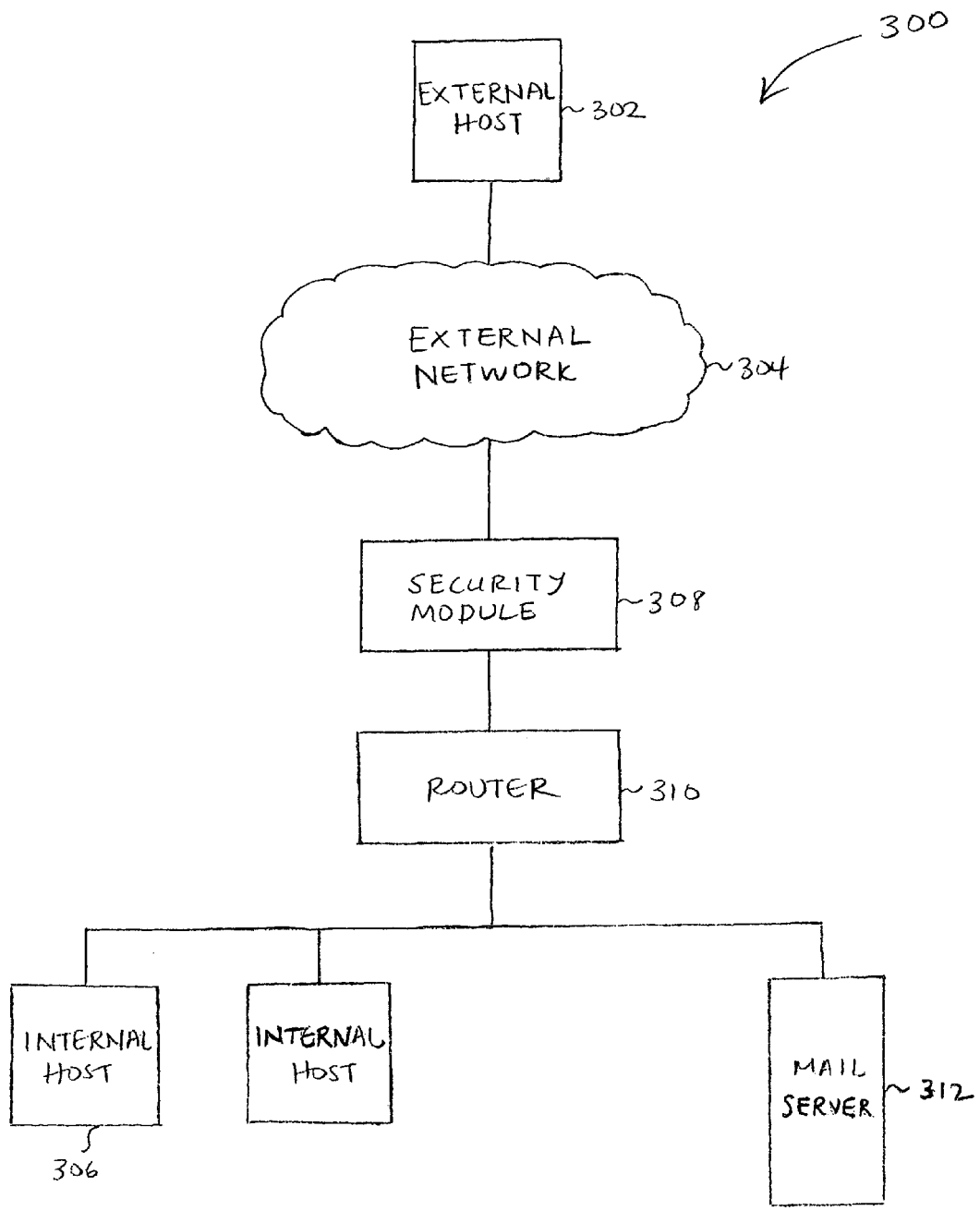
FIG. 3 illustrates an embodiment of a network environment in which data packets entering a secured internal network from an external network are validated before being subjected to any routing operations.

FIG. 3 illustrates an embodiment of a network environment in which data packets entering a secured internal network from an external network are validated before being subjected to any routing operations. In network environment 300, packets are transmitted from an external host 302 over an external network 304, such as the Internet, to an internal host, such as internal host 306, in a secured internal network. Packets entering the secured internal network are first processed by security module 308 at the boundary of the internal network. Security services associated with a firewall, intrusion detection and/or prevention system, anti-virus, etc., may be integrated into security module 308. For example, security module 308 may include one or more security nodes such as IPSEC decryption, ACLs, filtering, DoS check, IDS/IPS, content filtering, AV, NAT, Quality of Service (QoS), Protocol Anomaly Detection (PAD), signature matching, state machine, etc. Although in the given example security module 308 is depicted as a single device, in some embodiments, security module 308 may include multiple devices. The various security nodes comprising security module 308 may serially process incoming data packets or flows and/or may at least in part operate in parallel. If it is determined that a packet or flow corresponds to an attack, intrusion, exploit, virus, vulnerability, etc., the packet or flow may not be forwarded to its intended destination and may instead be subjected to an appropriate security response based upon the ingress security policy of the internal network. For example, the detection of a malicious, anomalous, or suspicious packet or flow by at least one node of security module 308 may result in the packet or flow being dropped, blocked, logged, etc., and/or an alert may be generated to an administrator and/or to the intended destination.

Packets that are verified as harmless by security module 308 are forwarded to router 310. Router 310 performs routing operations such as route lookup and packet forwarding that enable the routing of a packet or flow to its intended destination, such as internal host 306 or mail server 312. In some embodiments, a packet or flow that is found to be potentially malicious, anomalous, and/or suspicious by security module 308 is forwarded to router 310. In such a case, for example, the malicious, anomalous, and/or suspicious content may be removed and the remaining portion of the packet or flow may be transmitted to its intended destination, possibly accompanied by a notification of the removed content; the packet or flow may not be forwarded to its intended destination but instead to a prescribed destination in the internal network that is associated with handling and analyzing security events; etc.

In the example of FIG. 3, routing operations associated with routing a packet to its intended destination are performed only once and after the packet has been validated. The configuration of FIG. 3 eliminates unnecessary processing of packets. For example, if a packet or flow is found to be a potential threat, routing operations associated with routing the packet to its intended destination may not be performed on the packet or flow at all. In the example shown, security module 308 includes a WAN interface and as a result directly connects to external network 304 without requiring an access router. Although in the given example, security module 308 and router 310 are shown separately, in some embodiments, security module 308 and router 310 are part of a single, integrated device. In some embodiments, the nodes comprising security module 308 and/or router 310 can be arranged in any order. In some embodiments, a common syntax employed by the security and routing nodes enables flexibility in the arrangement or ordering of the nodes.

The configuration of FIG. 3 enables security services to be applied at the optimal data path points and facilitates the elimination of unnecessary and/or redundant processing. For example, the unnecessary routing of malicious, anomalous, and/or suspicious data packets or flows by router 108 of FIG. 1 and WAN access router 208 of FIG. 2 as well as the redundant routing of incoming data packets or flows by WAN access router 208 can be eliminated by the configuration of FIG. 3. In some embodiments, the configuration of FIG. 3 offers increased automation. For example, if in network environment 200 of FIG. 2, a DoS attack is initiated against the secured internal network, the DoS attack will not be detected until the affected packets are processed by a DoS attack detection node in security module 210. Data packets associated with the attack continue to be processed by WAN access router 208 until a network operator is able to issue a command to WAN access router 208 to drop the packets associated with the DoS attack so that further processing resources associated with the WAN access router are not consumed. However, if a DoS attack is initiated against the secured internal network in network environment 300 of FIG. 3, the packets associated with the attack may be automatically dropped by the DoS attack detection node in security module 308 and do not consume any resources associated with routing. The processing of the attack packets may be completely automated since operator intervention may not be necessary to halt the routing of packets associated with the attack because the packets may never reach any routing nodes. In some embodiments, in the configuration of FIG. 3, one or more security services are bypassed. For example, data packets or flows from an external network entering the internal network through a WAN interface may be subjected to a complete ingress security policy. However, data packets or flows coming from an ethernet interface from a trusted zone may be at least partially exempted from the ingress security policy.

Figure 4:
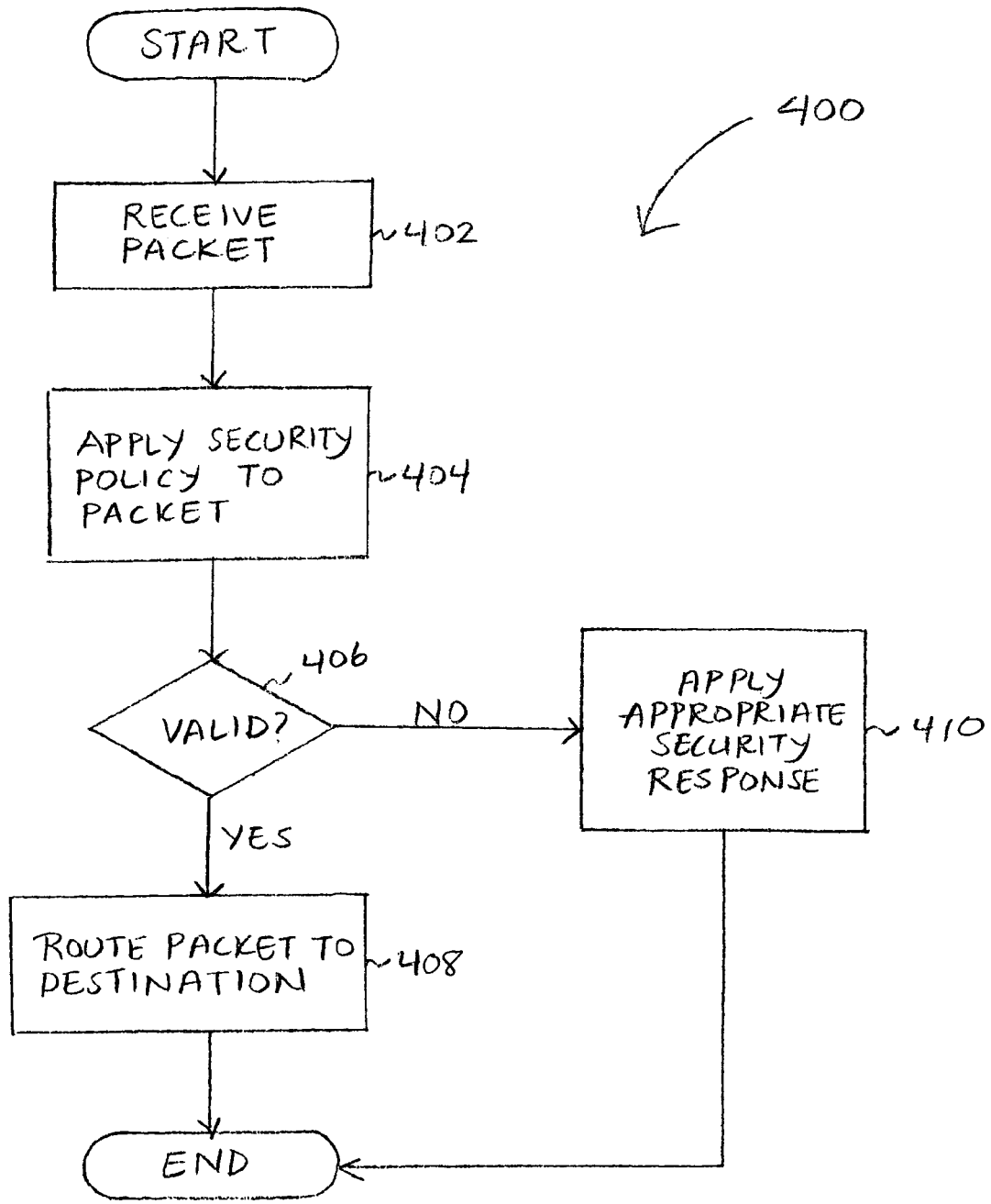
FIG. 4 illustrates an embodiment of a process for securely routing a packet from an external network into an internal network.

FIG. 4 illustrates an embodiment of a process for securely routing a packet from an external network into an internal network. At 402 of process 400, a packet is received, for example, from an external network such as the Internet. At 404, an ingress security policy is applied to the packet received at 402. The security policy may be implemented by one or more nodes such as IPSEC decryption, ACL, filtering, DoS check, IDS/IPS, content filtering, AV, NAT, PAD, signature matching, state machine, QoS, etc. At 406, it is determined if the packet has been validated as secure by all applicable security nodes through which it is processed at 404. If it is determined at 406 that the packet is valid, the packet is routed to its destination at 408, and process 400 ends. Routing the packet to its destination at 408 may include routing operations such as route lookup and packet forwarding. If it is determined at 406 that the packet is not valid, an appropriate security response is applied to the packet at 410, and process 400 ends. For example, depending on the ingress security policy specifications, the packet may be blocked, dropped, logged for future reference or analysis, etc. In some embodiments, an alert or notification may be generated to an administrator and/or the intended destination of the packet at 410.

In some embodiments, process 400 is executed on a per flow or per session basis. In some embodiments, an appropriate security response is applied to the packets of a flow that are determined to be malicious, anomalous, and/or suspicious, but valid packets of the flow are routed to their destination. In some embodiments, an appropriate security response is applied to an entire flow if any or at least a prescribed number of packets are determined to be malicious, anomalous, and/or suspicious. In some embodiments, the security policy of 404 and/or the appropriate security response at 410 are applied to a packet or a flow by one or more nodes of security module 308 of FIG. 3. In some embodiments, the packet or flow is routed at 408 by router 310 of FIG. 3.

Figure 5:
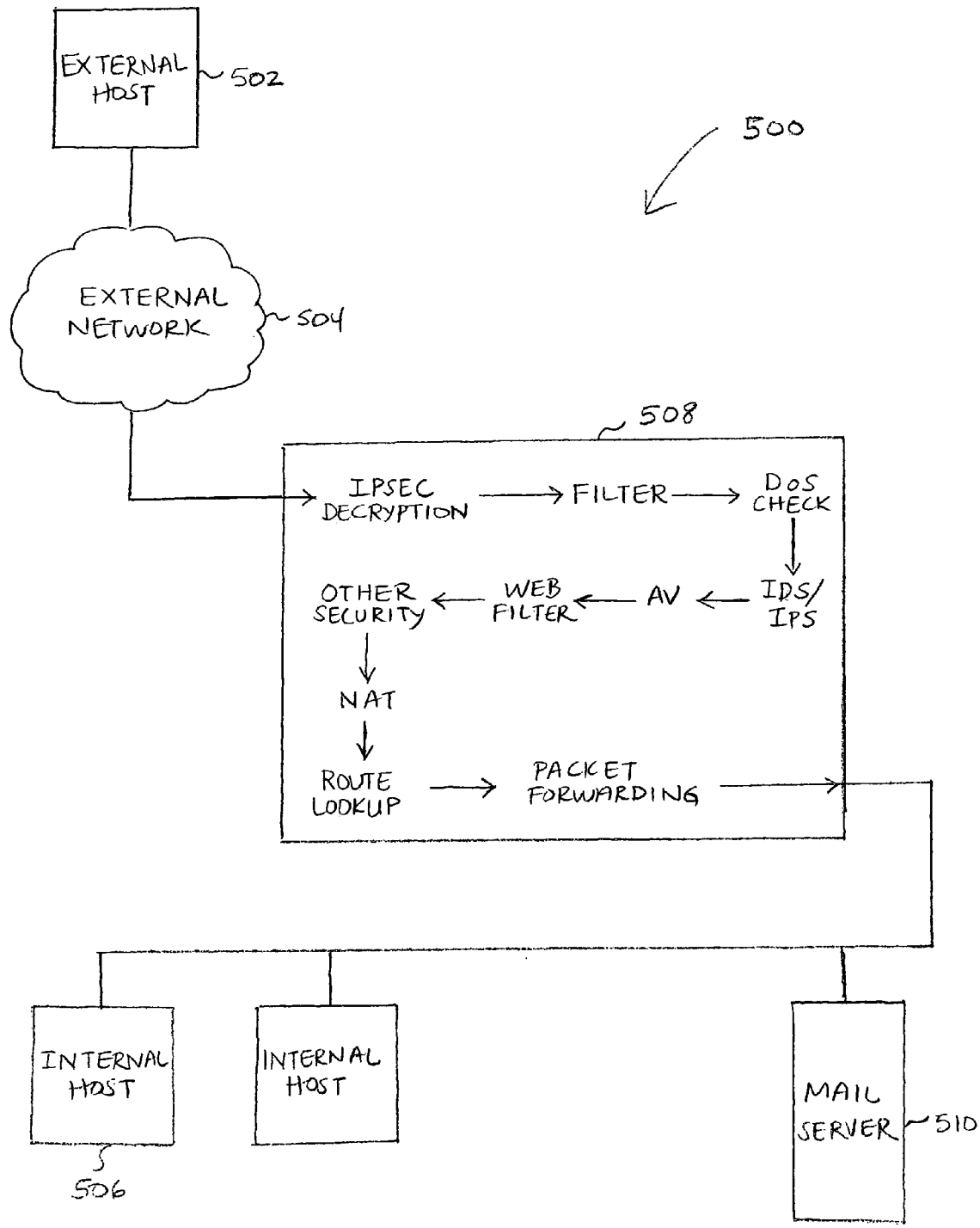
FIG. 5 illustrates an embodiment of a network environment in which data packets from an external host are forwarded to an internal host in a secured internal network by a unified services gateway at the boundary of the secured internal network.

FIG. 5 illustrates an embodiment of a network environment in which data packets from an external host are forwarded to an internal host in a secured internal network by a unified services gateway at the boundary of the secured internal network. In network environment 500, packets are transmitted from an external host 502 over an external network 504, such as the Internet, to an internal host, such as internal host 506, in a secured internal network. Packets entering the internal network are processed by unified services gateway 508 at the boundary of the internal network. In some embodiments, unified services gateway 508 includes security module 308 and router 310 of FIG. 3. Although in the given example unified services gateway 508 is illustrated as a single device, in some embodiments, unified services gateway 508 may be comprised of multiple devices. Unified services gateway 508 includes nodes associated with a firewall, IDS/IPS, AV, content filter, router, etc. In the given example, unified services gateway 508 specifically includes nodes for IPSEC decryption, filtering (e.g., via an ACL), DoS check, IDS/IPS, AV, web (content) filter, other security node(s) (e.g., QoS), NAT, route lookup, and packet forwarding. The nodes in unified services gateway 508 may be arranged in any order and may include other nodes in addition to or instead of some of the nodes depicted in FIG. 5 and/or may exclude some of the nodes depicted in FIG. 5. In the example of FIG. 5, the nodes are arranged so that incoming packets are first validated before being routed to their destination, such as to internal host 506, mail server 510, etc., in the internal network. A unified services gateway, such as unified services gateway 508 of FIG. 5, enables security and routing nodes to be built on a unified platform. Such a unified platform may provide an improved ability to add, remove, and/or update one or more nodes in a gateway device. For example, platform APIs may be available for third parties to update or remove existing nodes and/or to add new nodes that have been independently developed and validated before integration into the gateway device.

In some embodiments, the nodes of a gateway, such as unified services gateway 508 of FIG. 5, employ a common, extensible syntax to define a common classification of packets. A packet may be classified, for example, in order to facilitate selected processing on the packet at a node based on an ingress network security policy. A network security policy may be defined by a set of one or more rules or policies. A rule or policy may be defined by a basic packet matching specification. A rule or policy definition may be based on packet parameters such as protocol, source address, destination address, source port, destination port, source interface, destination interface, etc., and/or one or more lists of such parameters. Moreover, a rule or policy definition may include a set of one or more rules or policies. In some embodiments, the classification of a packet is based at least in part on the group of rules that the packet matches or satisfies. For example, a packet may be compared against one or more rules in the set of rules defining an ingress network security policy, and the packet's classification may be based at least in part on the rules that the packet matches or satisfies.

Typically, a packet is classified multiple times as it is processed by various gateway nodes. When a packet is locally classified at each node, it is possible to customize the classification of a packet with respect to the functionality of each node. For example, if the processing or actions associated with a node are only affected by a subset of rules that define a complete network security policy, a packet can be classified with respect to only such a subset of rules. However, since packet classification at each node is generally based at least on some of the same set of information associated with a packet, such as the source address, destination address, source port, destination port, protocol, etc., and since the packet may be compared against at least some of the same rules or policies at multiple nodes, repeatedly classifying a packet as it passes through the various nodes in the node graph of a gateway results in unnecessary processing. It is therefore useful to separate the classification of a packet from the actions at a node by globally classifying a packet for all or at least a subset of nodes in a gateway in a single pass. Classification can be performed once for a particular packet, and each node can use the classification result to determine a node-specific action for the packet.

Although packet classification with respect to an ingress network security policy may be described, packets may be similarly classified with respect to any network policy or a subset thereof. Although single pass classification of a packet in a unified services gateway configuration such as 508 of FIG. 5 may be described, a packet may be classified in a single pass in any configuration, e.g., the gateway configurations of FIGS. 1-3. Although single pass classification of a packet may be described, a flow or session may likewise be classified in a single pass.

Figure 6:
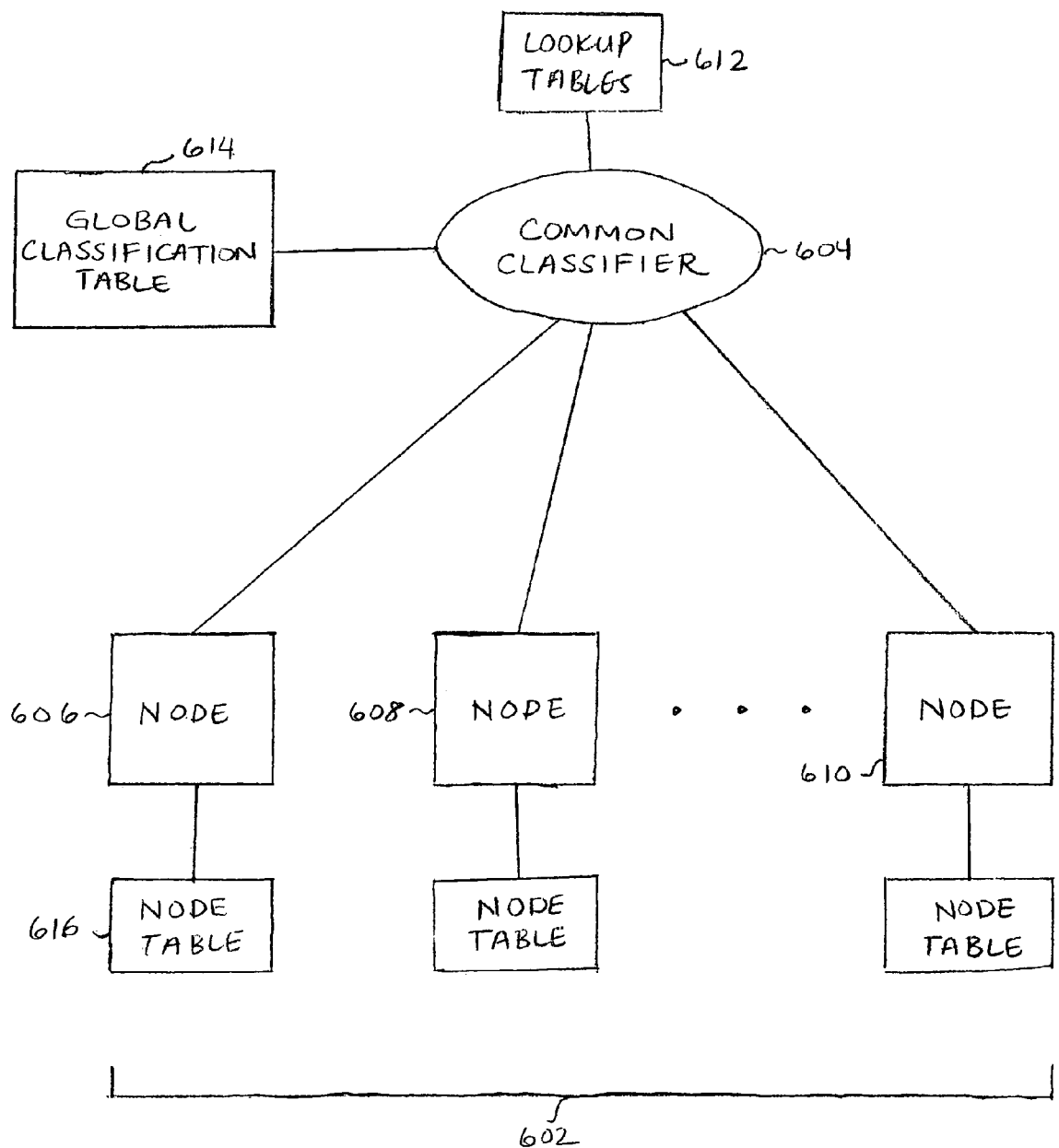
FIG. 6 illustrates an embodiment of a manner in which a packet may be globally classified for multiple nodes in a single pass.

FIG. 6 illustrates an embodiment of a manner in which a packet may be globally classified for multiple nodes in a single pass. As shown in the given example, a set of nodes 602 employ a common classifier 604 to classify packets. In some embodiments, the set of nodes 602 includes one or more nodes in a unified services gateway, such as unified services gateway 508 of FIG. 5. In some embodiments, the nodes of set 602 serially process a packet. For example, a data packet may be received and processed by node 606 and then serially processed by at least some of the remaining nodes, such as nodes 608 and 610. Alternatively, a data packet may be processed in any other appropriate manner or order by one or more nodes in the set of nodes 602.

A node that receives a packet that has not already been classified sends the packet to common classifier 604 to classify the packet. Although in the given example common classifier 604 is depicted as an external module, in some embodiments, a node includes an instance of common classifier 604. Upon receiving a packet for classification, common classifier 604 reads information associated with the packet, such as from the packet header and/or body. Such information may include, for example, protocol, source address, destination address, source port, destination port, source interface, destination interface, etc. The packet information may be used by common classifier 604 to determine which rules in the network security policy are satisfied or matched by the packet. In some embodiments, packet information is compared with lookup tables 612 associated with one or more rules of the network security policy. In some embodiments, the rules satisfied or matched by a packet define a single classification outcome. A set of unique classification outcomes may be stored and/or indexed in a table. In the given example, a set of unique classification outcomes are stored and indexed in global classification table 614. Each indexed entry in global classification table 614 specifies a set of one or more rules that need to be satisfied to have that unique classification. In some embodiments, global classification table 614 is part of a set of one or more global classification tables. Common classifier 604 determines whether a packet to be classified satisfies an existing classification in global classification table 614. If the packet does not satisfy any existing classification in global classification table 614, a new index/classification entry is created in global classification table 614 for the packet. In some embodiments, once a packet's unique classification has been determined, the classification index associated with that classification is attached to the packet. In some embodiments, the classification index is written into the packet context. In some embodiments, the classification index is written into the packet header.

The node-specific security policy of each node may be defined at least in part by the actions or processing to be performed by a node on different types of packets received by the node and may be stored in an appropriate data structure at each node. As depicted in the given example, each node in the set of nodes 602 includes a node-specific table, such as node table 616 of node 606. A node table lookup may be performed at a node to determine the actions or processing to be performed on a particular type of packet received at the node. In some embodiments, a node table includes a specific node action for each classification index in global classification table 614. In some embodiments, a node table is indexed by a classification index in one dimension and a node instance identifier in another dimension. In some embodiments, once a packet is classified, a corresponding node table lookup is sufficient at each node to determine which actions or processing, if any, to perform on the packet at that node. Since the packet classification is part of the packet, the packet does not need to be repeatedly classified as it is processed by various nodes.

FIG. 7 illustrates an embodiment of a global classification table. In some embodiments, table 700 corresponds to global classification table 614 of FIG. 6. Each row, such as row 702, corresponds to a specific classification index. Although each classification index uniquely identifies a particular classification, the actual index value may be reused to uniquely identify another classification, e.g., when table 700 is recompiled. The first column 704 corresponds to the classification index. Each classification index represents a unique classification outcome and may be obtained by classifying a packet against one or more rules associated with a network security policy. Although the classification index is depicted as an integer value in the given example, any appropriate value may be used. Each of the rest of the columns of table 700 corresponds to a rule $(R_1, R_2, \ldots, R_n)$ included, for example, in a network security policy. All or a subset of the rules included in a network security policy may be included as columns in table 700. Each classification index identifies a unique subset of one or more rules that need to be satisfied for that classification. In some embodiments, a boolean value is used to specify a particular subset of rules. For example, a "1" may be entered into table 700 for a rule that needs to be satisfied for a particular classification, and a "0" may be entered for a rule that is not satisfied for that classification. For instance, in the given example, for a packet to have a classification index of "1", the packet needs to match rules $R_2$, $R_4$, and $R_5$ but not the rest of the rules. In some embodiments, table 700 is a truth table. Table 700 may be recompiled as new classification indices are generated; obsolete or unwanted classification indices are removed; rules are added, modified, and/or deleted; nodes using the classifications are added to and/or removed from a node graph; an overflow in the allocation of classification indices occurs; a request for recompilation is received from a node (e.g., during node initialization); etc. In some embodiments, when a global classification table such as table 700 or 614 of FIG. 6 is updated or recompiled, one or more node tables, such as node table 616 of FIG. 6, are also recompiled so that the classification indices and/or sets of matching rules for each classification index in the node tables are synchronous with those in the global classification table.

Since recompilation of a global classification table and corresponding node tables may require considerable CPU time, in some embodiments, multiple instances of tables may be employed. For example, two sets of table instances may be used, so that one set can be used for packet matching and processing, and another set can be used for recompilation. Each set can be uniquely identified by a set number. In some embodiments, at any given time, a single set of table instances is active. In some embodiments, a common classifier, such as common classifier 604 of FIG. 6, selects a set as the active set and communicates the set number of the active set to the various nodes, such as nodes 602 of FIG. 6, processing a packet so that the corresponding instances of the private node tables associated with the active set are employed when processing the packet at the nodes.

Figure 8:
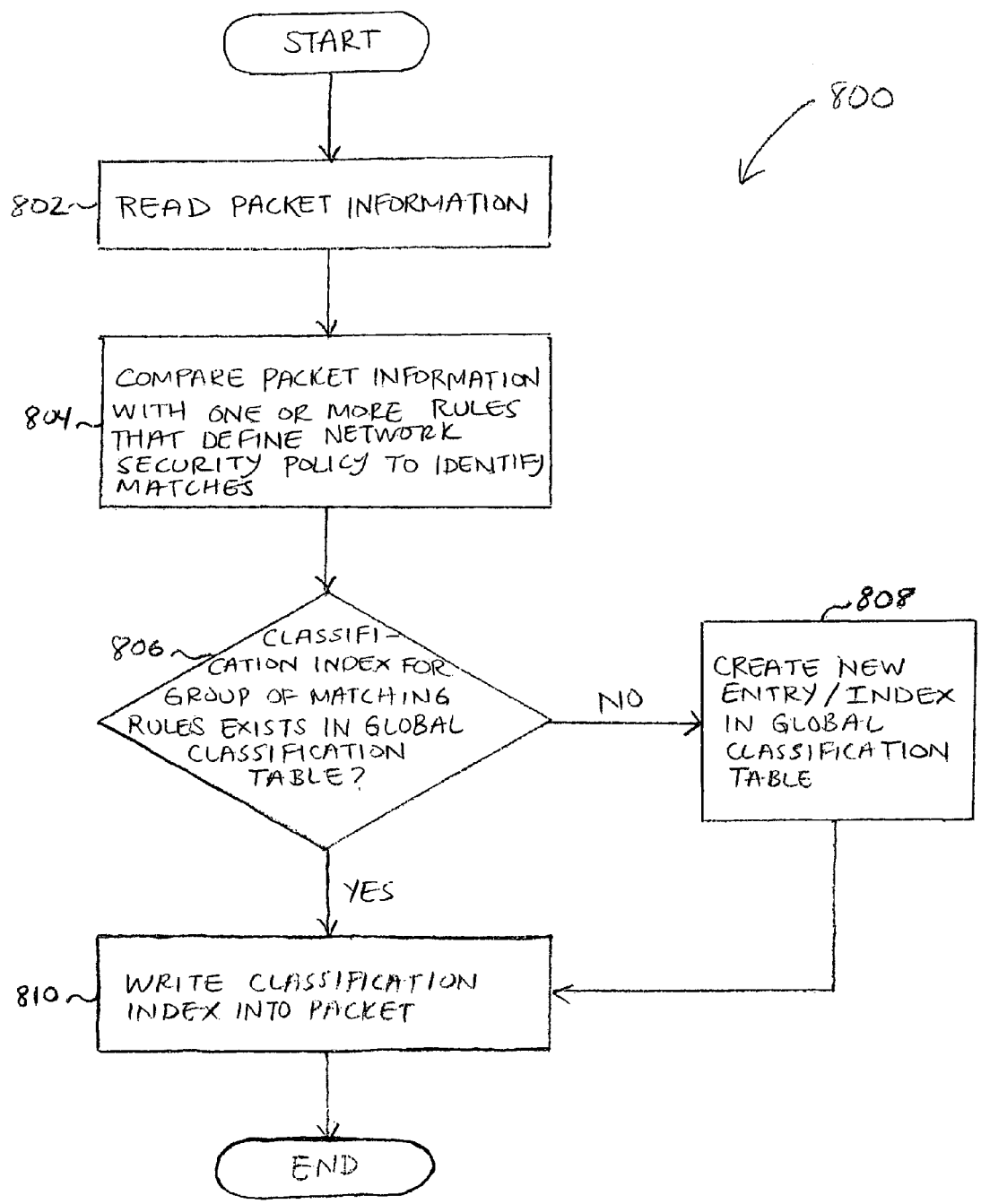
FIG. 8 illustrates an embodiment of a process for classifying a packet.

FIG. 8 illustrates an embodiment of a process for classifying a packet. In some embodiments, process 800 is employed by common classifier 604 of FIG. 6. At 802, information associated with a packet that is needed for classification is read. Information may be read from the packet header and/or context. The packet information read at 802 may include, for example, one or more of source address, destination address, source port, destination port, source interface, destination interface, protocol, etc. At 804, the packet information read at 802 is compared against one or more rules that define a network security policy to identify matches. In some embodiments, lookup tables such as lookup tables 612 of FIG. 6 are used to determine which rules are matched or satisfied by the packet. At 806, it is determined whether a classification index associated with the group of matching rules exists in a global classification table such as global classification table 614 of FIG. 6 or 700 of FIG. 7. If it is determined at 806 that a classification index associated with the group of matching rules does not exist, a new classification index/entry is created in the global classification table for the group of matching rules at 808. In some embodiments, when a global classification table is updated such as at 808, one or more node tables, such as node table 616 of FIG. 6, are recompiled so that they remain synchronous with the global classification table. If it is determined at 806 that a classification index associated with the group of matching rules exists or upon generating a new classification index for the group of matching rules at 808, the classification index corresponding to the group of matching rules is written into the packet at 810, and process 800 ends. The classification index may be written into the packet header and/or context.

In some embodiments, the classification index is valid for the life of the packet processing for a packet, e.g., for the duration of the entire node graph processing. However, if a packet is queued or sidelined at any point, its classification index may no longer be valid. For example, if at any stage packet header values are modified and/or a key portion of the packet context that is used in the packet classification is modified, the classification index of the packet may no longer be valid. In some embodiments, when one or more packet header and/or context values used for classification are altered, the current classification index of the packet, if any, is invalidated, and a new classification of the packet may need to be performed for further processing of the packet. In some embodiments, the validity of a classification index of a packet is managed via a "classification index valid" bit of the packet. Such as bit may be a part of the packet header, packet context flags field, etc. For example, if the classification index valid bit is set, the classification index associated with the packet may be considered to be valid and may be used by a node processing the packet. However, if the classification index valid bit is clear, the classification index associated with the packet may be considered to be invalid or obsolete, and the packet may need to be reclassified. In some embodiments, whenever a packet is classified, the valid bit is set. In some embodiments, 810 of FIG. 8 includes setting the valid bit.

In some embodiments, a classification index is allocated when a new unique outcome of a classification lookup is discovered. However, a new classification outcome may not occur for every packet, for every flow, or even for every new packet IP address encountered. The number of unique outcomes may vary widely, for example, from a few to potentially many millions. The number of unique outcomes may be based at least in part on factors such as the number and/or complexity of rules defining a policy, the packet header and/or context values being classified, the nature of packet traffic, etc. For example, it is possible to have a very large set of rules but still have a very small number of outcomes. Likewise, it is possible to have a small set of rules but a large number of outcomes.

In some embodiments, once a packet has been classified, e.g., by the first node through which it is processed, other nodes use the same classification index as long as the classification index is valid. A node uses the classification index to lookup in a private data structure, such as node table 616 of FIG. 6, a mapping of the classification index to an action that is meaningful to that particular node. In some embodiments, multiple instances of a particular node may exist, each of which may perform an instance specific action for a given classification index. For example, for a filter node processing a packet, the action associated with each classification index may depend on the filter instance processing the packet. Thus, in some embodiments, the private date structure of a node comprises a two dimensional table, with one dimension corresponding to the classification index and the other dimension corresponding to the node instance.

Figure 9:
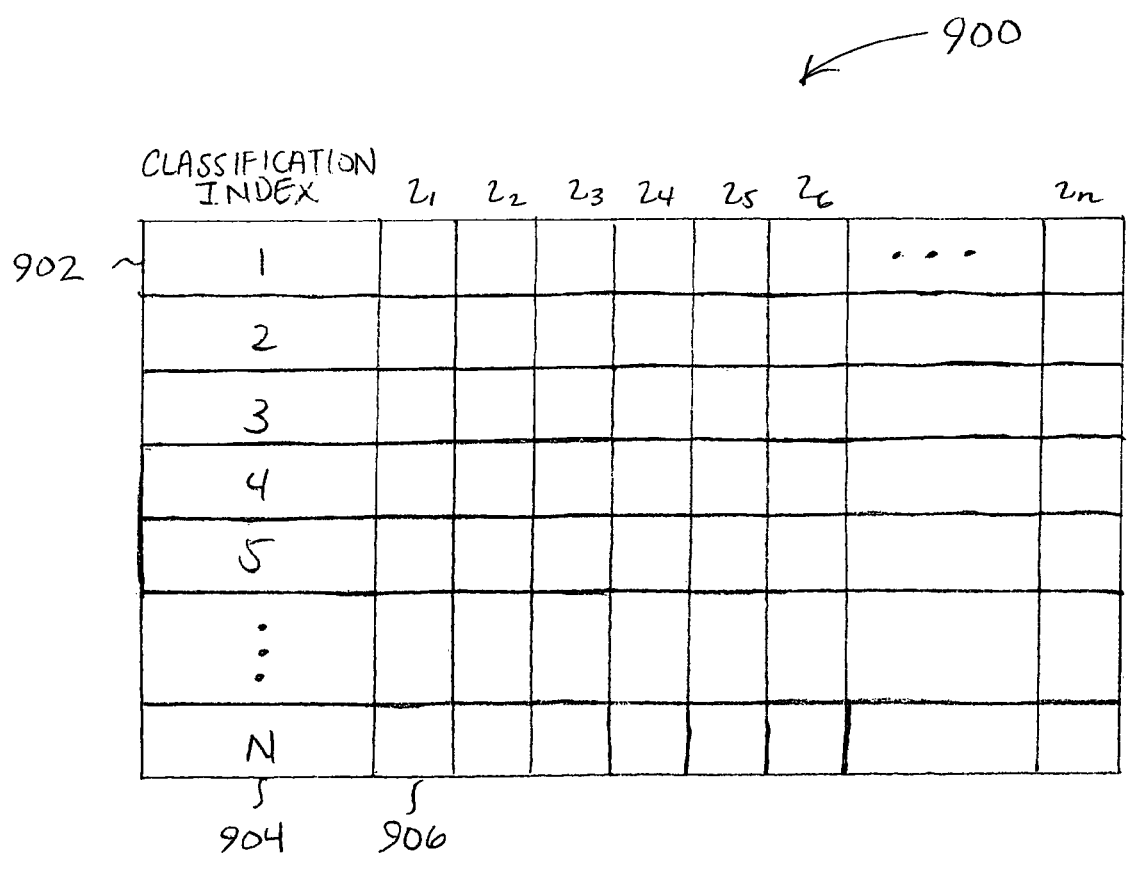

FIG. 9 illustrates an embodiment of a node table. In some embodiments, table 900 corresponds to node table 616 of FIG. 6. As illustrated, each row, such as row 902, corresponds to a specific classification index. In some embodiments, table 900 includes all of the classification indices defined in a corresponding global classification table, such as global classification table 614 of FIG. 6 or 700 of FIG. 7. In some embodiments, table 900 includes a subset of the classification indices defined in a corresponding global classification table. The first column 904 corresponds to the classification index. Each of the rest of the columns, such as column 906, corresponds to a node instance (i.e. $i_1, i_2, \ldots, i_n$). Each cell of the node table includes an action that defines the manner in which a node instance is to process a packet. For example, for a filter node, possible actions may include "permit" and "deny". In some embodiments, a cell of a node table includes an array of one or more pointers to one or more counters associated with the rules of a network security policy. In some embodiments, for each rule that is matched by a packet, an associated counter is incremented. It may be useful to keep track of such counter values as part of the statistics associated with a gateway and may affect the manner in which a security policy is implemented. In some embodiments, a node table such as table 900 is recompiled or updated whenever a corresponding global classification table is recompiled.

In the example of FIG. 9, a node table lookup is a node instance specific result. The classification index for the lookup is provided by the packet being processed. The node instance number may be provided by the node instance processing the packet. For example, an instance of a filter node may have an associated filter index or instance number as part of its private node data, and this value may be used for lookup in a common filter node table (i.e. a table used by all filter instances) such as table 900 of FIG. 9. Similarly, an instance of a QoS node in a node graph could include a policy index indicating which policy it is associated with, and that policy index could be used in conjunction with the classification index to obtain the QoS parameters (e.g., priority, bandwidth, etc.) required by that particular QoS instance for a given classification index. In some embodiments, a node index or instance number is not needed for lookup because, for example, only one instance of the node exists. In some embodiments, a node index or instance number is not needed because a node instance has its own table and does not share a common table with other node instances.

Figure 10:
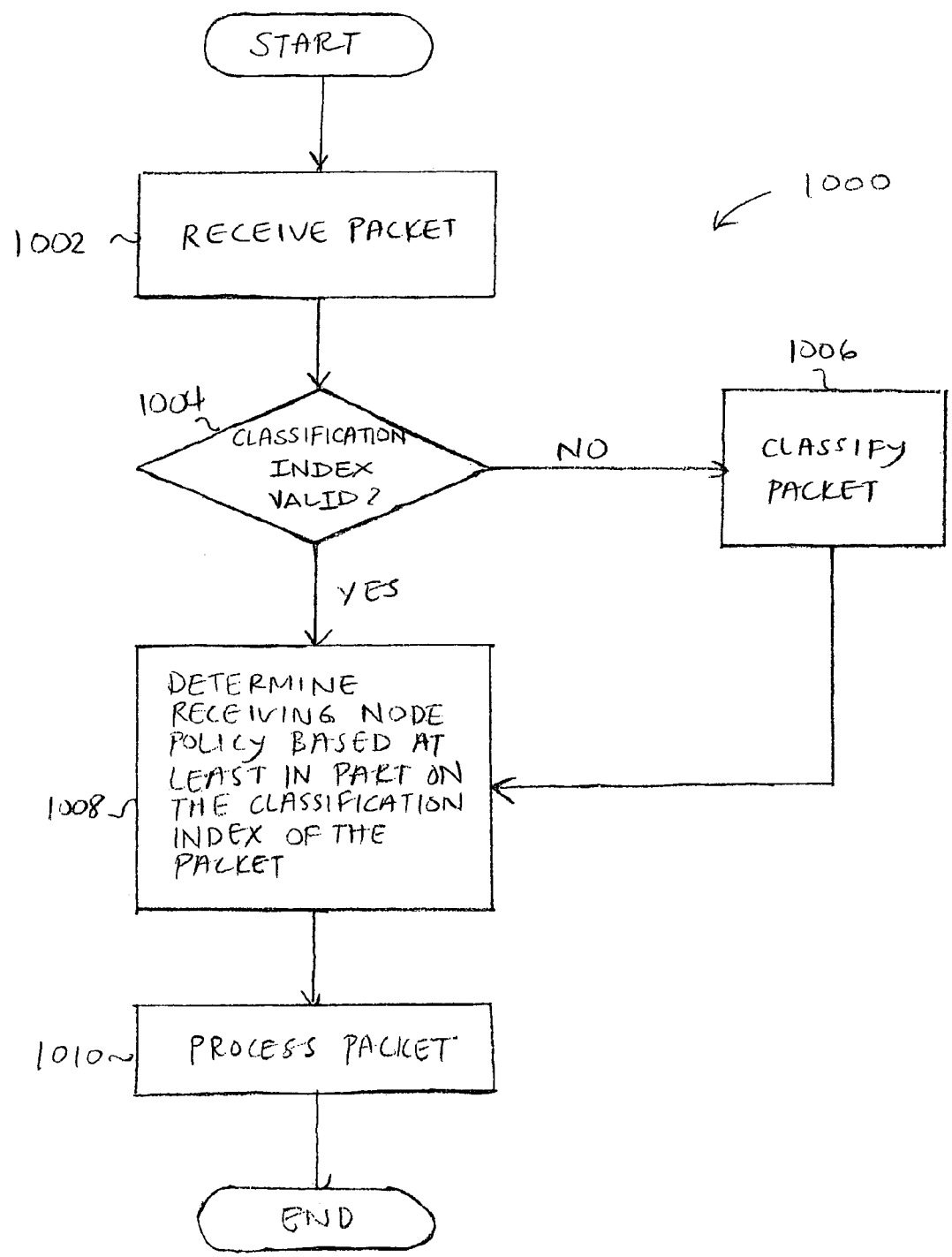
FIG. 10 illustrates an embodiment of a process for processing a packet at a node.

FIG. 10 illustrates an embodiment of a process for processing a packet at a node. In some embodiments, process 1000 is employed by a node such as node 606 of FIG. 6. At 1002, a packet is received by a node. For example, the packet may be received by the node directly from an external network such as 104, 204, 304, and 504 of FIGS. 1, 2, 3, and 5, respectively; from another node in a node graph; from a host within an internal network; etc. At 1004, it is determined if the classification index of the packet received at 1002 is valid. In some embodiments, the classification index of a packet is valid if an associated classification index valid bit is set. If it is determined at 1004 that no valid classification index exists, the packet is classified at 1006. In some embodiments, it is determined at 1004 that no valid classification index exists for the packet if an associated classification index valid bit is not set (i.e. it is clear). The classification index valid bit may be clear, for instance, if the packet has never been classified or if at least one or more portions of the packet associated with determining classification is altered after the packet was last classified. In some embodiments, at 1006 the packet is sent to a common classifier, such as common classifier 604 of FIG. 6, to be classified. In some embodiments, process 800 of FIG. 8 is employed at 1006 to classify the packet. In some embodiments, when a packet is classified at 1006, the classification index valid bit associated with the packet is set. If it is determined at 1004 that the classification index of the packet received at 1002 is valid or if the packet is classified at 1006, the receiving node policy for the packet is determined based at least in part on the classification index of the packet at 1008. In some embodiments, determining the receiving node policy includes looking up an action in a node table such as node table 616 of FIG. 6 or 900 of FIG. 9 using at least the classification index of the packet. In some embodiments, a node instance identifier is also used in the node table lookup. At 1010, the packet is processed by the receiving node based on the node policy determined for the packet at 1008, and process 1000 ends. That is, the action looked up in an associated node table is applied to the packet at 1010. In some embodiments, process 1000 is employed by each node in the node graph of a gateway that processes the packet.

When a packet is processed by a node of a gateway, information or content associated with the packet that is needed by the node to process the packet is read, extracted, and/or evaluated at the node. Some of this information may also be needed by other gateway nodes that process the packet. Typically, each node individually inspects a packet for information needed to process the packet. However, if the same or similar information is needed at multiple nodes to process the packet, inspecting the packet at each node for such information results in redundant processing. The processing of a packet through the nodes of a gateway can be improved if at least the content or information read, extracted, and/or evaluated at a particular node that is also needed at other nodes is made globally available to the other nodes in the gateway. In some embodiments, therefore, it is useful to inspect a packet for a commonly needed piece of information in a single pass at a node and make this information available to other nodes in a gateway. Such information may be centrally stored and managed in a common session that is accessible to the gateway nodes.

Although single pass inspection of a packet in a unified services gateway configuration such as 508 of FIG. 5 may be described, a packet may be inspected for information in a single pass in any configuration, e.g., the gateway configurations of FIGS. 1-3. Although single pass classification and inspection of a packet may be described, a packet may be inspected for information in a single pass although it is not classified in a single pass. Likewise, a packet may be classified in a single pass without being inspected in a single pass. Although single pass inspection of a packet may be described, a flow or session may be likewise inspected in a single pass. For example, information that is common to an entire flow or session may be determined or extracted only once and centrally stored so that it is available to the nodes processing the flow or session.

Figure 11:
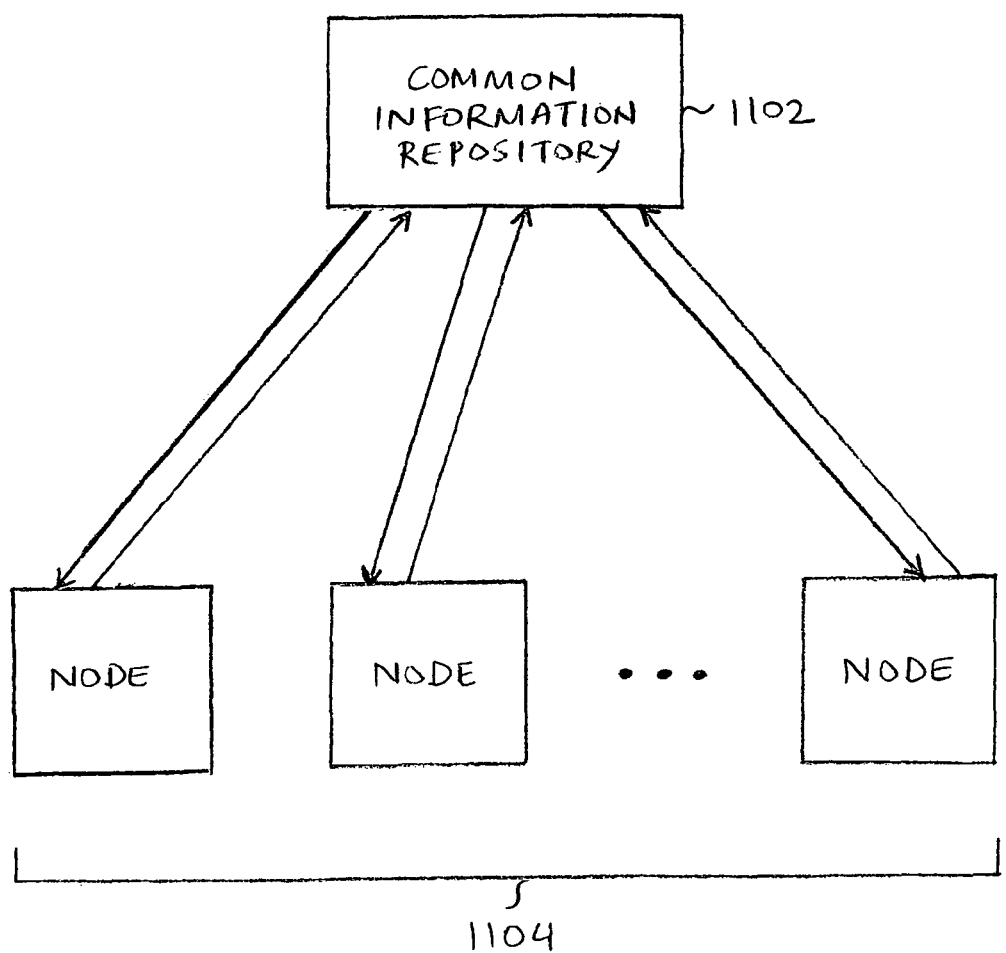
FIG. 11 illustrates an embodiment of a manner in which multiple nodes may share information needed to process a packet and/or flow.

FIG. 11 illustrates an embodiment of a manner in which multiple nodes may share information needed to process a packet and/or flow. As shown in the given example, a common information repository 1102 is globally accessible by a set of nodes 1104. In some embodiments, the common information repository comprises a firewall session table. In some embodiments, the set of nodes 1104 corresponds to the nodes of a gateway, such as unified services gateway 508 of FIG. 5. In some embodiments, the set of nodes 1104 corresponds to set 602 of FIG. 6. The set of nodes 1104 may write information to and read information from common information repository 1102. The node that first extracts a piece of information from a packet and/or flow that may be useful for the processing of the packet and/or flow at other nodes may store the extracted information in common information repository 1102. If subsequent nodes that process the packet and/or flow need this information, they can access it from common information repository 1102 without having to extract the information from the packet and/or flow again. Thus, the use of a commonly shared storage location, such as common information repository 1102, allows the elimination of redundant packet processing, provides centralized data management, and improves over-all system performance.

The data associated with a packet and/or flow that is stored in common information repository 1102 may be purged when it is no longer needed by any other node processing the packet and/or flow. In some embodiments, the data associated with a packet and/or flow that is stored in common information repository 1102 is purged once the packet and/or flow has been processed by all nodes in a gateway. In some embodiments, the data stored in common information repository 1102 is purged periodically or, for example, at the expiration of associated timers. In some embodiments, the data associated with a particular session in common information repository 1102 is purged once that session has been processed. In some embodiments, some data, such as packet and/or flow statistics, are saved in common information repository 1102 or in another storage location even after the packet and/or flow has been completely processed by all nodes in a gateway.

The URL of a packet may be needed by various nodes, such as the IDS/IPS node, AV node, URL filter node, etc., during processing of the packet. Typically, each node that needs the URL extracts the URL from the packet header and normalizes the URL so that is can be compared against the node policy. The extraction and normalization of the URL of a packet at each of a plurality of nodes results in redundant processing. It is useful, therefore, to centrally store the URL of a packet in a shared storage location, such as common information repository 1102, so that it is extracted and normalized only once as the packet is processed by various nodes. The first node that needs the normalized URL of a packet to process the packet extracts the URL from the packet header; normalizes it, for example, by converting it into hexadecimal form; and stores the normalized URL in a globally accessible location, such as common information repository 1102, making it available to subsequent nodes that need to use it to process the packet. In some embodiments, the stored URL is not normalized. In some embodiments, in the cases where the IDS/IPS node employs Snort, Snort's HTTP Inspect Preprocessor is modified to check if the URL of a packet is already extracted and normalized in a shared storage location such as common information repository 1102 to avoid redundantly performing these operations. In some embodiments, in the cases where the IDS/IPS node is the first node to need the URL of a packet to process the packet, Snort's HTTP Inspect Preprocessor is modified so that the URL extracted and normalized by Snort's HTTP Inspect Preprocessor is stored in a shared storage location such as common information repository 1102 rather than in a private session table.

In some embodiments, it may be useful for some nodes such as IDS/IPS, PAD/SM (Protocol Anomaly Detection/State Machine), AV, etc., to be stream (i.e. flow) based rather than packet based. For example, if an SMTP protocol state machine is packet based, it may not find the correct state if one command consists of multiple packets. Consider, for instance, that the first packet is "RCPT a1 @netd.com, a2@netd.com," and the second packet is "a3@netd.com\r\n". If the state machine is packet based, it would identify the first packet as having the "RCPT" state but would not find a matching keyword for the second packet, generating a false protocol anomaly. However, if the state machine is stream based, it could call an API to assemble a data chunk until "ren" is collected, match keywords, and make a correct state transition. During processing, multiple nodes may need a stream associated with the same packet, and it may be desirable to collect and reassemble the stream only once in order to avoid redundant processing. In some embodiments, therefore, it is useful to store reassembled TCP stream data in a dedicated area, such as common information repository 1102. In some embodiments, the first time a stream is collected for a particular packet, the packet context, for example, is marked to indicate to subsequent nodes to directly access the reassembled stream from the common information repository instead of repeating the same operations on the packet. In some embodiments, a count of the number of nodes that are using a particular stream may be maintained, and the stream may be released only when the count becomes zero. In some embodiments, the stream data may be released from memory once a particular stream or flow has been processed by all nodes that are stream based, once the stream has been processed by all of the nodes of the gateway, once a timer associated with the maximum amount of time a stream is allowed to be stored expires, etc. In some embodiments, a threshold associated with the maximum size a stream is allowed to be accumulated to is set to safeguard against any particular stream from occupying an excessive amount of memory.

In some embodiments, a shared storage location such as common information repository 1102 is used to store the current protocol state. At some nodes, the action to be performed on a packet or stream is based at least in part on the current protocol state of the stream. For example, the AV node collects mail content and scans for viruses in the SMTP DATA state but may ignore other SMTP states. At the PAD node, the current state may be checked to determine if it is an unexpected or unknown state.

In some embodiments, a shared storage location such as common information repository 1102 is used to store the scanning state of the AV node, such as if it is currently collecting TCP stream data or if it is waiting for return data from a scan engine.

Figure 12:
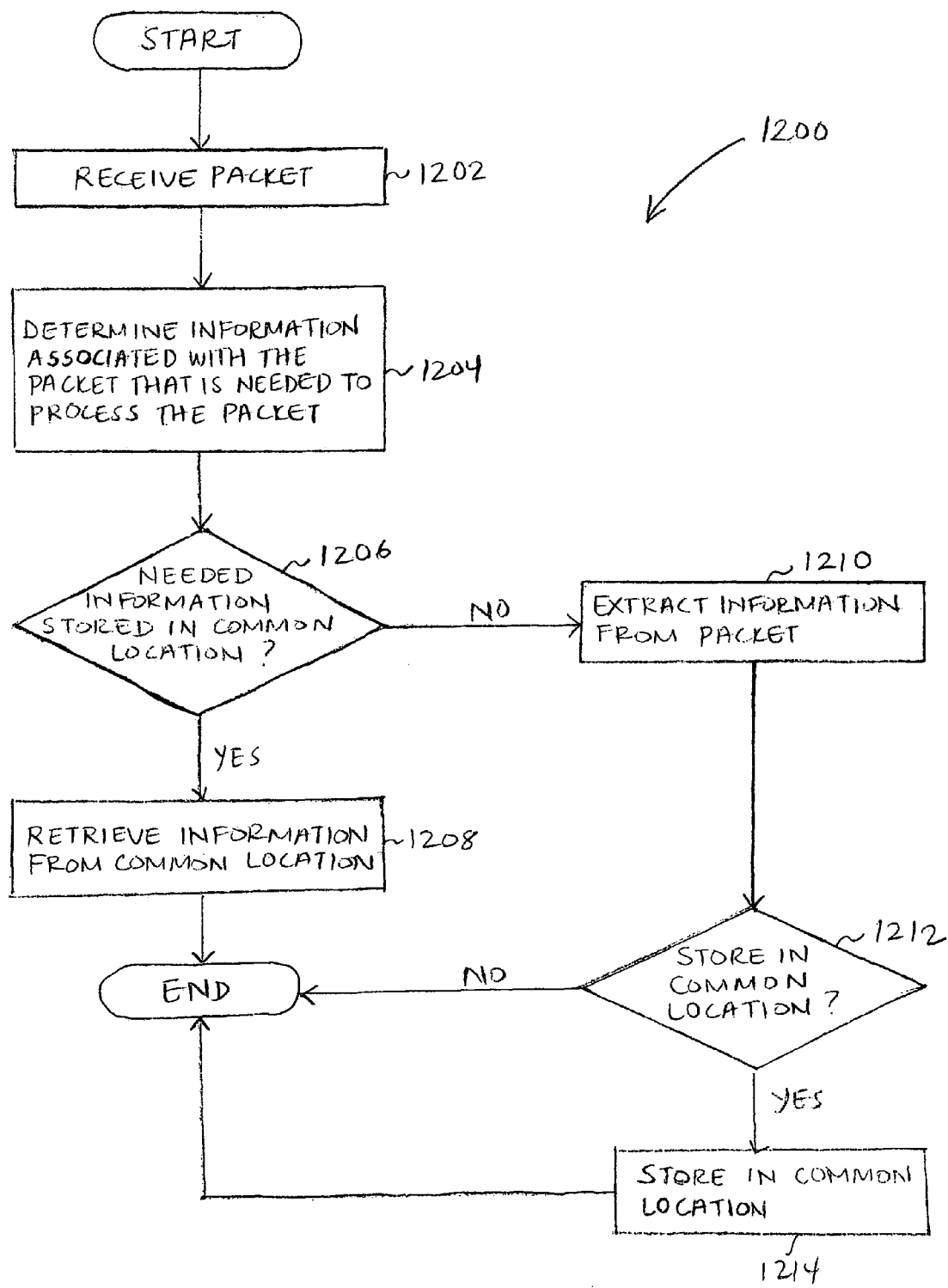
FIG. 12 illustrates an embodiment of a process for obtaining information associated with a packet that is used to process the packet at a node.

FIG. 12 illustrates an embodiment of a process for obtaining information associated with a packet that is used to process the packet at a node. In some embodiments, process 1200 is employed by one or more nodes of unified services gateway 508 of FIG. 5. In some embodiments, process 1200 is employed by one or more nodes in set 602 of FIG. 6. In some embodiments, process 1200 is employed by nodes 1104 of FIG. 11. At 1202, a packet is received by a node. For example, the packet may be received by a node directly from an external network, such as 104, 204, 304, and 504 of FIGS. 1, 2, 3, and 5, respectively; from another node in the node graph of a gateway; from a host within an internal network; etc. At 1204, information associated with the packet that is needed to process the packet is determined. The information associated with the packet that is needed to process the packet that is determined at 1204 may include, for example, the (normalized) URL of the packet, the reassembled TCP stream associated with the packet, the current protocol state, statistics associated with the packet and/or its associated flow, etc. At 1206, it is determined if the needed information is already stored in a common location accessible by the node such as common information repository 1102 of FIG. 11. If it is determined at 1206 that the needed information is stored in a common location, it is retrieved from the common location at 1208, and process 1200 ends. If it is determined at 1206 that the needed information is not already stored in a common location, the needed information is extracted from the packet at 1210. At 1212, it is determined if the information extracted at 1210 should be stored in the common location so that other nodes can use it without having to individually extract it from the packet. If it is determined at 1212 not to store the information extracted at 1210 in the common location, process 1200 ends. In some embodiments, it is determined at 1212 not to globally store the information extracted at 1210 because the information is not needed by other nodes. If it is determined at 1212 to store the information extracted at 1210 in the common location, the information is stored in the common location at 1214, and process 1200 ends. In some embodiments, it is determined at 1212 to globally store the information extracted at 1210 because it is first determined for or extracted from the packet or associated flow at 1210 and may be useful to subsequent nodes that process the packet and/or flow. In some embodiments, the common location is common information repository 1102 of FIG. 11. In some embodiments, the common location is a master session table. In some embodiments, process 1200 is performed on a per-flow or per-session basis. That is, information that is common to a flow or session is globally stored in a common location that is shared by a plurality of nodes. In some embodiments, information associated with a packet may be both retrieved from a common location and extracted from the packet when the packet is processed at a node.

Figure 13:
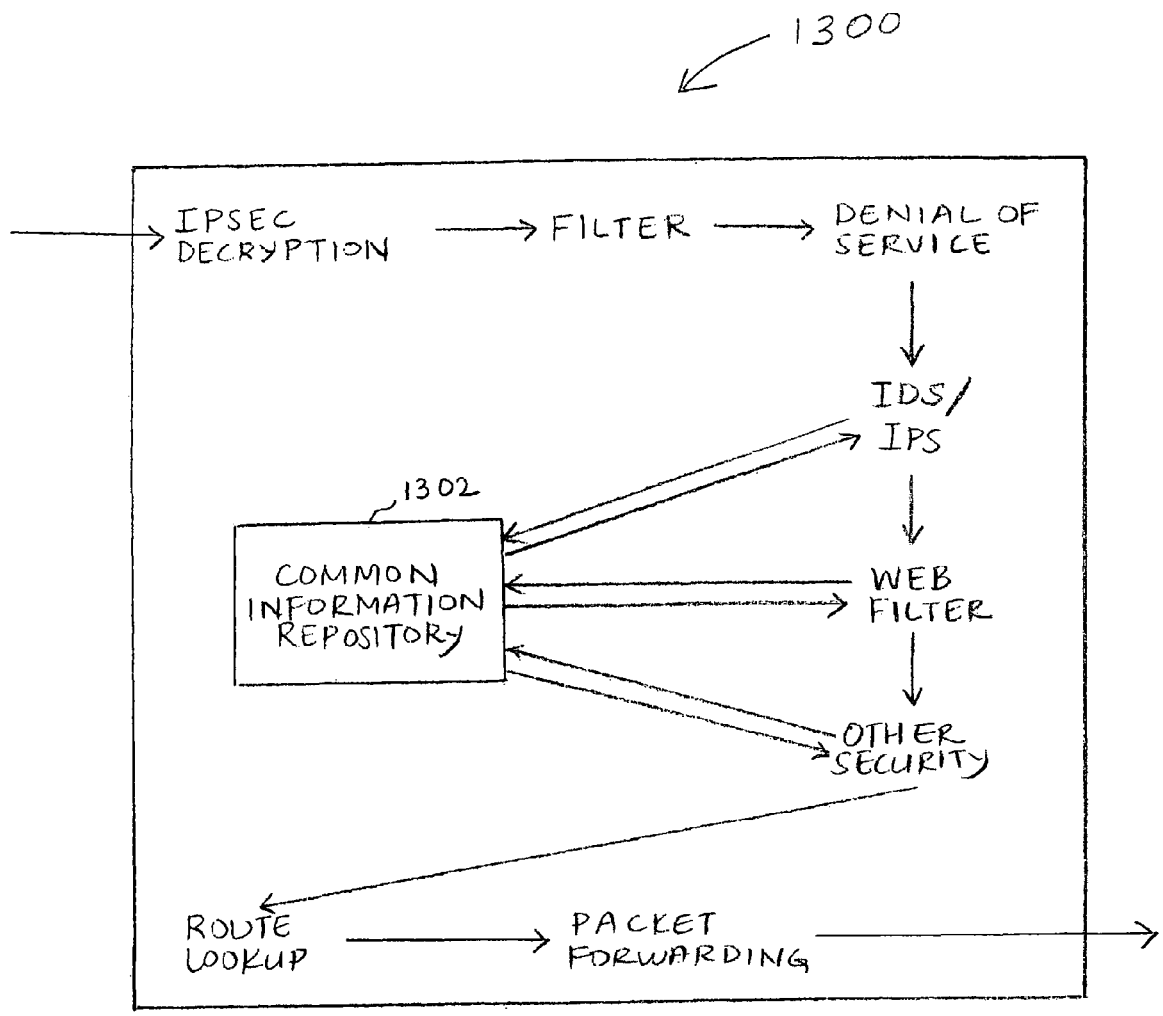
FIG. 13 illustrates an embodiment of a unified services gateway in which an incoming packet is classified a single time, information associated with the packet is centrally stored, and the packet is checked for security before being routed to its destination.

FIG. 13 illustrates an embodiment of a unified services gateway in which an incoming packet is classified a single time, information associated with the packet is centrally stored, and the packet is checked for security before being routed to its destination. In the given example, a packet entering gateway 1300 is first decrypted and classified at an IPSEC decryption node. The packet is classified just once at this first node for all services in gateway 1300, and an associated classification index is forwarded with the packet throughout gateway 1300. The packet is then processed by a filter node that accepts or denies it. From the filter, the packet undergoes a denial of service check. As deep content security services such as intrusion detection and prevention, web filtering, etc., are performed, the gateway performs common processes such as URL extraction and normalization, reassembly of an associated TCP stream, protocol state determination, etc., a single time. Content from the security inspection is stored in common information repository 1302 and retrieved by follow-up security services as needed. The gateway finally performs routing and forwarding a single time and only when the packet is deemed to be fully safe and legitimate. In alternative embodiments, gateway 1300 may include a different combination and/or arrangement of nodes, classification may be performed at one or more nodes other than or in addition to the first node, all or a different subset of nodes may have access to common information repository 1302, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a packet, comprising:
   determining if the packet is classified according to an attribute of a classification index, the classification index being a part of a set of one or more classification indices and said attribute includes a classification index valid bit; and
   using, when the packet has been classified, the classification data of the packet to determine a node-specific policy of the receiving node applicable to the packet, wherein a plurality of node-specific policies associated with a plurality of nodes is specified using the classification data, the plurality of nodes including the receiving node, wherein at least two of the plurality of node-specific policies are different, and wherein the at least two node-specific policies are associated with respective at least two different nodes of the plurality of nodes.

2. The method as recited in claim 1, wherein the plurality of nodes comprises nodes in a unified services gateway.

3. The method as recited in claim 1, wherein the determining whether the packet is classified according to an attribute of a classification index comprises determining whether the classification index valid bit of the packet is set.

4. The method as recited in claim 1, wherein the classification data of the packet uniquely identifies a set of one or more rules in a network security policy that the packet satisfies.

5. The method as recited in claim 4, wherein each rule in the set of one or more rules is based at least in part on one or more of a source address, a destination address, a source port, a destination port, a source interface, a destination interface, a protocol, a list of source addresses, a list of destination addresses, a list of source ports, a list of destination ports, a list of source interfaces, a list of destination interfaces, a list of protocols, and one or more other rules.

6. The method as recited in claim 1, wherein the classification data of the packet comprises a classification index written into one or more of a header of the packet and a context of the packet, wherein as the packet travels between nodes of the plurality of nodes a single pass classification of the packet is enabled using the classification data of the packet.

7. The method as recited in claim 1, wherein the classification data of the packet comprises a classification index, wherein the node-specific policy of the receiving node is stored in a data structure associated with the receiving node, and the data structure is indexed by the set of classification indices in one dimension.

8. The method as recited in claim 7, wherein the data structure is indexed by a set of receiving node instance identifiers in a second dimension.

9. The method as recited in claim 1, wherein the classification data of the packet comprises a classification index and wherein the using the classification data of the packet to determine the node-specific policy of the receiving node comprises using the classification index to look up the node-specific policy of the receiving node in a data structure associated with the receiving node.

10. The method as recited in claim 1, further comprising processing the packet based at least in part on the node-specific policy of the receiving node.

11. The method as recited in claim 1, further comprising:
    modifying one or more of a packet header of the packet and a context of the packet; and
    invalidating the classification data of the packet.

12. A method as recited in claim 11, wherein the invalidating the classification data of the packet comprises clearing a classification index valid bit of the packet.

13. The method as recited in claim 1, wherein the classification data of the packet comprises a classification index, wherein the classification data of the packet uniquely identifies a set of one or more rules in a network security policy that the packet satisfies, and the classification index and the corresponding set of one or more rules are included as an entry in a global classification table.

14. The method as recited in claim 13, wherein the global classification table comprises a truth table.

15. The method as recited in claim 13, wherein the global classification table is a part of a set of one or more global classification tables.

16. The method as recited in claim 1, wherein the packet is part of a flow and wherein the node-specific policy of the receiving node is determined for the flow.

17. The method as recited in claim 1, wherein the plurality of nodes includes one or more of an IPSEC decryption node, an Access Control List (ACL) node, a filter node, a Denial-of Service (DoS) attack checking node, a content filter node, an intrusion detection node, an intrusion prevention node, an Anti-Virus (AV) node, a Network Address Translation (NAT) node, a Protocol Anomaly Detection (PAD) node, a signature matching node, a state machine node, and a Quality of Service (QoS) node.

18. A system for processing a packet, comprising:
    a processor configured:
        to determine whether the packet is classified, wherein the classified packet comprises a classification index valid bit for indicating whether the packet has been classified and classification data; and
        to use the classification data of the packet to determine a node-specific policy of the receiving node; and
    a memory coupled with the processor, the memory configured to provide the processor with instructions,
    wherein a plurality of node-specific policies associated with a plurality of nodes is specified using the classification data, the plurality of nodes including the receiving node, wherein at least two of the plurality of node-specific policies are different, and wherein the at least two node-specific policies are associated with respective at least two different nodes of the plurality of nodes.

19. The system as recited in claim 18, wherein the classification data of the packet uniquely identifies a set of one or more rules in a network security policy that the packet satisfies.

20. A non-transitory computer readable storage medium storing computer instructions, that, when executed by a computer, cause the computer to perform a method for processing a packet, the method comprising:
    determining whether the packet has been classified, wherein the classified packet comprises a classification index valid bit and classification data, wherein the classification index valid bit being set indicates that the packet is classified; and using the classification data of the packet to determine a node-specific policy of the receiving node, wherein a plurality of node-specific policies associated with a plurality of nodes including the receiving node is specified using the classification data, wherein at least two of the plurality of node-specific policies are different, and wherein the at least two node-specific policies are associated with respective at least two different nodes of the plurality of nodes.

* * * * *